US009957931B2

(12) United States Patent
Kobayashi et al.

(10) Patent No.: US 9,957,931 B2
(45) Date of Patent: *May 1, 2018

(54) SUCTION FILTER AND FUEL SUPPLYING DEVICE

(71) Applicant: DENSO CORPORATION, Kariya, Aichi-pref. (JP)

(72) Inventors: Kiyomori Kobayashi, Kariya (JP); Norihiro Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/235,654

(22) Filed: Aug. 12, 2016

(65) Prior Publication Data

US 2017/0138323 A1   May 18, 2017

(30) Foreign Application Priority Data

Nov. 16, 2015 (JP) .................................. 2015-224130

(51) Int. Cl.
  *B01D 29/88*   (2006.01)
  *F02M 37/02*   (2006.01)
  (Continued)

(52) U.S. Cl.
  CPC ........... *F02M 37/02* (2013.01); *B01D 35/005* (2013.01); *B01D 35/027* (2013.01);
  (Continued)

(58) Field of Classification Search
  CPC ............... F02M 37/02; F02M 37/0023; F02M 37/0088; F02M 37/22; F02M 37/10;
  (Continued)

(56) References Cited

U.S. PATENT DOCUMENTS 6,789,568 B1 * 9/2004 Bunnell ................. B60K 15/03
  137/265
7,182,869 B2 * 2/2007 Catlin ................ B01D 35/0273
  210/315

(Continued)

FOREIGN PATENT DOCUMENTS

JP   2012-67736 A   4/2012

*Primary Examiner* — Claire A Norris
*Assistant Examiner* — Julia L. Wun (57) ABSTRACT

The present disclosure provides a suction filter that filters a fuel inside a fuel tank of a vehicle. The suction filter includes a filter element, a partitioning wall element, a passage element, and an open/close valve. The filter element is disposed in and exposed inside of the fuel tank. The filter element filters a stored fuel stored in the fuel tank. The partitioning wall element is arranged in the inside space to divide the inside space into a first space and a second space that is lower than the first space. The inlet to take in the filtered fuel is open in the second space. The passage element defines an inflow opening open in the first space, an outflow opening to which a negative suction pressure is applied through the inlet, and a flow passage through which the filtered fuel flows. The open/close valve closes the inflow opening when a liquid level of the filtered fuel is above the partitioning wall element and that closes the inflow opening when the liquid level is below the partitioning wall element.

5 Claims, 9 Drawing Sheets (51) Int. Cl.
  *F02M 37/00* (2006.01)
  *B01D 35/027* (2006.01)
  *B01D 35/26* (2006.01)
  *B01D 35/00* (2006.01)
  *B01D 35/157* (2006.01)
  *F02M 37/22* (2006.01)

(52) U.S. Cl.
  CPC ......... *B01D 35/1573* (2013.01); *B01D 35/26* (2013.01); *F02M 37/0023* (2013.01); *F02M 37/0076* (2013.01); *F02M 37/0088* (2013.01); *B01D 2201/16* (2013.01); *B01D 2201/202* (2013.01); *F02M 2037/228* (2013.01)

(58) Field of Classification Search
  CPC ......... F02M 37/0076; F02M 2037/228; B01D 35/1573; B01D 35/005; B01D 35/027; B01D 35/26; B01D 35/02; B01D 2201/202; B01D 2201/16
  USPC ....... 210/110, 172.1–172.3, 172.6, 459, 460, 210/416.1, 416.4
  See application file for complete search history.

(56) References Cited

U.S. PATENT DOCUMENTS

2005/0274361 A1  12/2005  Ikeya
2011/0192786 A1   8/2011  Nagai et al.

\* cited by examiner

SUCTION FILTER AND FUEL SUPPLYING DEVICE

CROSS REFERENCE TO RELATED APPLICATION

This application is based on reference Japanese Patent Application No. 2015-224130 filed on Nov. 16, 2015, the disclosure of which is incorporated herein by reference.

TECHNICAL FIELD

The present disclosure relates to a suction filter and a fuel supplying device.

BACKGROUND

Conventionally, there has been known a fuel supplying device that supplies fuel from a fuel tank of a vehicle to an outside of the fuel tank. In such a fuel supplying device, a fuel pump disposed in the fuel tank takes in fuel from an inlet and discharges the fuel toward the outside of the fuel tank. A device disclosed in Patent Literature 1 (JP 2011-163198 A) includes a suction filter, and a fuel pump takes in fuel from an inlet after filtering the fuel by the suction filter in the fuel tank.

The suction filter disclosed in Patent Literature 1 includes a filter element disposed in the fuel tank. This filter element forms a liquid film when a stored fuel stored in the fuel tank passes through the filter element, and filters the stored fuel. The liquid film is maintained while an outer surface of the filter element is being in contact with the stored fuel. Therefore, in the suction filter of Patent Literature 1, the outer surface of the filter element is partially covered with a side wall member. Accordingly, even when a liquid level of the stored fuel is angled due to bias of the stored fuel during turning of the vehicle and even when the liquid level separates from the filter element, contact of a portion of the outer surface of the filter element with fuel captured between the side wall member and the filter element can be maintained. As a result, in the filter element where the liquid film is maintained, fuel is mainly taken into the inside space having the inlet, and suction of air into the inlet can be suppressed.

In the suction filter disclosed in Patent Literature 1, an inflow opening is defined in the side wall member to allow fuel to flow through between the filter element and the side wall member. Thus, when a vehicle is turning, for example, a liquid level of fuel between the filter element and the side wall member is angled, and therefore the fuel may be likely discharged from the inflow opening according to angles of the liquid level. Thus, when an amount of fuel captured between the filter element and the side wall member decrease, the amount of the captured fuel is exhausted in a short time according to the progress of suction of fuel, and as a result it may be difficult to maintain the liquid film. As a result, air is introduced into an inside space from an outside space of the filter element, and a large amount of fuel remains in the inside space without being taken into the inlet. This is because when a ratio of the volume of air to the volume of the inside space has a specified value or more, only air is substantially taken into the inlet and filtered fuel remains in the inside space. Such suction of air significantly effects on a discharging performance of the fuel pump, and therefore a measure to address this has been required.

In view of the above, it is an objective of the present disclosure to provide a suction filter that stabilizes a discharging performance of a fuel pump, and a fuel supplying device having the suction filter.

SUMMARY

A first aspect of the present disclosure provides a suction filter that filters a fuel inside a fuel tank of a vehicle. The fuel is taken into an inlet of a fuel pump. The suction filter includes a filter element, a partitioning wall element, a passage element, and an open/close valve. The filter element is disposed in and exposed inside of the fuel tank. The filter element filters a stored fuel stored in the fuel tank by allowing the stored fuel to pass therethrough into an inside space of the filter element. The partitioning wall element is arranged in the inside space to divide the inside space into a first space and a second space that is lower than the first space. The filtered fuel filtered by the filter element flows into the first space. The inlet to take in the filtered fuel is open in the second space. The partitioning wall element defines the first space together with the filter element and defines the second space together with the filter element. The passage element defines an inflow opening that is open in the first space, an outflow opening to which a negative suction pressure is applied through the inlet, and a flow passage through which the filtered fuel flows toward the outflow opening from the inflow opening. The open/close valve closes the inflow opening when a liquid level of the filtered fuel in the inside space is above the partitioning wall element and opens the inflow opening when the liquid level is below the partitioning wall element.

A second aspect of the present disclosure provides a fuel supplying device that supplies a fuel inside a fuel tank of a vehicle to an outside of the fuel tank. The fuel supplying device includes a fuel pump and a suction filter. The fuel pump takes in the fuel through an inlet in the fuel tank and discharges the fuel toward the outside of the fuel tank. The suction filter filters the fuel in the fuel tank. The fuel is taken into the inlet after being filtered by the suction filter. The suction filter includes a filer element, a partitioning wall element, a passage element, and an open/close valve. The filter element is disposed in and exposed inside the fuel tank. The filter element filters a stored fuel stored in the fuel tank by allowing the stored fuel to pass therethrough into an inside space of the filter element. The partitioning wall element is arranged in the inside space to divide the inside space into a first space and a second space that is lower than the first space. The filtered fuel filtered by the filter element flows into the first space. The inlet to take in the filtered fuel is open in the second space. The partitioning wall element defines the first space together with the filter element and defines the second space together with the filter element. The passage element defines an inflow opening that is open in the first space, an outflow opening to which a negative suction pressure is applied through the inlet, and a flow passage through which the filtered fuel flows toward the outflow opening from the inflow opening. The open/close valve closes the inflow opening when a liquid level of the filtered fuel in the inside space is above the partitioning wall element and that closes the inflow opening when the liquid level is below the partitioning wall element.

In the first and second aspects, a liquid film is formed on the filter element that is exposed inside of the fuel tank when the stored fuel passes through the filter element from the fuel tank into the inside space. Thus, even when a vehicle is turning and the liquid level is angled to separate from the filter element in the fuel tank, it is possible to suppress the stored fuel to be leaked from the inside space.

Furthermore, the partitioning wall element of the first and second aspects is arranged to divide the inside space of the filter element into the first space into which the filtered fuel from the filter element flows and the second space where the inlet of the fuel pump is open. A liquid film is formed on the partitioning wall element when the filtered fuel passes through the partitioning wall element from the first space to the second space. As a result, the filtered fuel can be captured in the first space defined by the partitioning wall element in an upper side of the inside space together with the filter element with the above-described liquid film.

In the first and second aspects, even when the liquid level of the stored fuel is angled in the fuel tank, contact of the filtered fuel of the first space with the partitioning wall element can be maintained under a state where capturing capacity is secured due to leaking suppression effects by the filter element. As a result, in the partitioning wall element, which defines the second space in a lower side of the inside space together with the filter element, the liquid film is maintained. Therefore, the filtered fuel can be taken into the second space having the inlet from the first space. Accordingly, suction of air into the inlet can be suppressed by effectively using the filtered fuel in the first space, and thus discharging performance of the fuel pump can be stabilized.

In addition, the passage element according to the first and second aspects defines the flow passage from the inflow opening, which is open in the first space, toward the outflow opening, to which a negative suction pressure of the inlet is applied. Therefore, the negative suction pressure is also applied to the inflow opening through the flow passage from the outflow opening. In this case, even when air flows into the first space, the liquid level of the filtered fuel is above the partitioning wall element in the inside space, and thus the open/close valve closes the inflow opening. As a result, when the filtered fuel in the first space is taken into the second space through the partitioning wall element, and then is substantially exhausted, air flows into not only the first space but also the second space that is below the first space. In this case, the liquid level of the filtered fuel is positioned below the partitioning wall element in the inside space, and as a result, the open/close valve opens the inflow opening. Hence, air flowing into the inflow opening from the first space due to a negative suction pressure is discharged to the inlet from the outflow opening through the flow passage.

As described above, air mixed with the filtered fuel in the first space is restricted from flowing into the inflow opening, and then is allowed to flow into the inflow opening from the first space where the filtered fuel is substantially exhausted. Therefore, the air can be taken into the inlet in a short time. Thus, a necessary time for take air into the inlet is shortened, and deterioration in the stability of discharging performance of the fuel pump can be suppressed. Further, since suction of air into the inlet can be instantly performed in the first space, a space for capturing the filtered fuel can be instantly obtained again. Thus, the filtered fuel can be effectively used again immediately. As a result, it is further possible to suppress deterioration in the stability of the discharging performance of the fuel pump.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, a plurality of embodiments of the present disclosure will be described in detail. It is needless to say that the embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments.

First Embodiment

Figure 1:
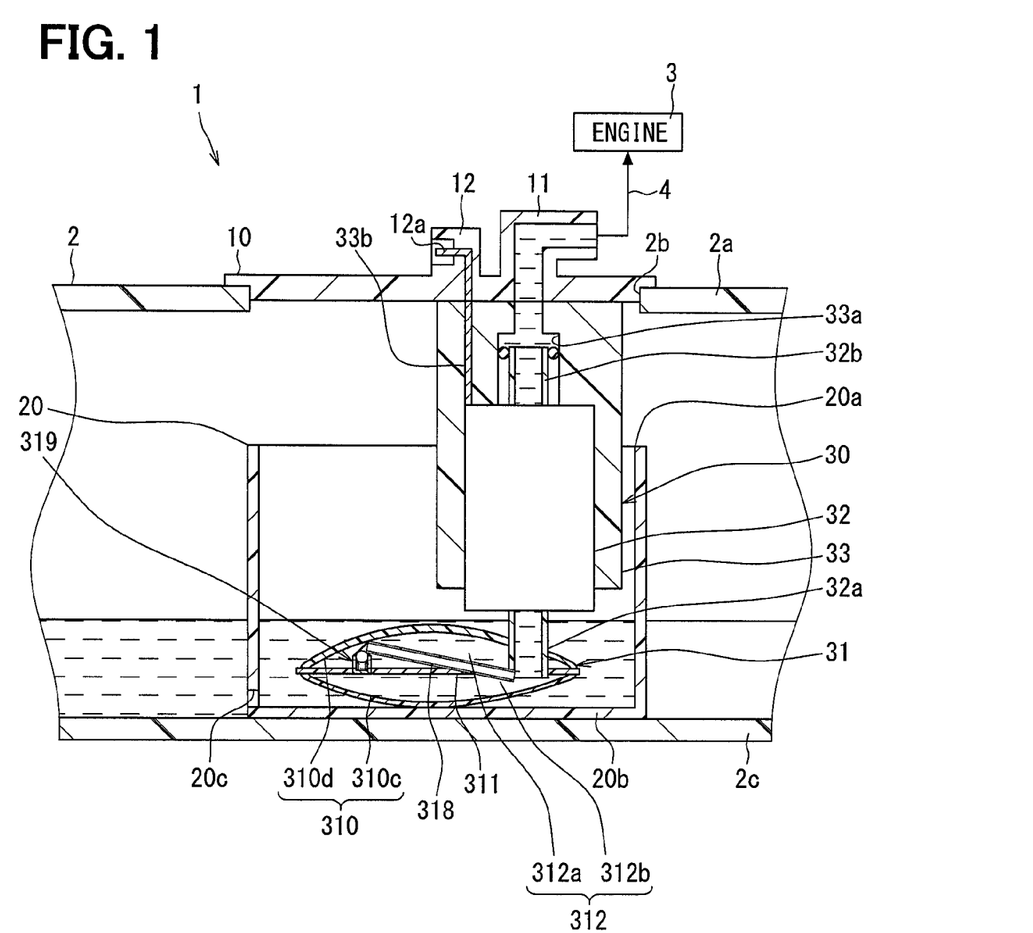
FIG. 1 is a cross-sectional view of a fuel supplying device according to a first embodiment.

As shown in FIG. 1, a fuel supplying device 1 according to the first embodiment is mounted to a fuel tank 2 of a vehicle. The device 1 supplies a fuel inside the fuel tank 2 to an internal combustion engine 3 outside of the fuel tank 2. The fuel tank 2 is formed of resin with a hollow shape to store fuel to be supplied to the internal combustion engine 3. The internal combustion engine 3 may be a gasoline engine or a diesel engine. It should be noted that a horizontal direction and a vertical direction for the vehicle on a vertical surface substantially correspond to a lateral direction and a vertical direction (an upper/lower direction) in FIG. 1, respectively.

Next, an entire configuration of the device 1 will be described below.

The device 1 includes a flange 10, a sub tank 20, and a pump unit 30.

The flange 10 is formed of hard resin to have a disk shape. The flange 10 is disposed in a top portion 2a of the fuel tank 2b. The flange 10 covers a through hole 2b passing through the top portion 2a.

The flange 10 integrally has a fuel supply pipe 11 and an electric connector 12. The fuel supply pipe 11 is in fluid communication with the pump unit 30 inside the fuel tank 2. Also, the fuel supply pipe 11 is in fluid communication with a fuel pass 4 outside of the fuel tank 2 between the fuel supply pipe 11 and the internal combustion engine 3. The fuel supply pipe 11 supplies a fuel, which was taken by the fuel tank 32 of the pump unit 30 in the fuel tank 2, to the internal combustion engine 3 outside of the fuel tank 3. A metal terminal 12a is disposed inside the electric connector 12. The metal terminal 12a is electrically connected to the pump unit 30 in the fuel tank 2. The metal terminal 12a is electrically connected to an external control circuit outside of the fuel tank 2. Therefore, the fuel pump 32 of the pump unit 30 can be controlled by the external control circuit.

The sub tank 20 is formed of hard resin to have a cylindrical shape with a bottom. The sub tank 20 has an opening 20a and is arranged in the fuel tank 2 such that the opening 20a is open upward. A bottom portion 20b of the sub tank 20 is arranged on a bottom portion 2c of the fuel tank 2. An inlet opening 20c is formed to pass through the sub tank 20 at a position close to the bottom portion 20b. Thus, a fuel stored in the fuel tank 2 (hereinafter, referred to as a "stored fuel") flows into the sub tank 20 through the inlet opening 20c.

The pump unit 30 is arranged in the fuel tank 2 to extend over the sub tank 20. The pump unit 30 includes a suction filter 31, a fuel pump 32, and a communication member 33.

The suction filter 31 has a flat shape as a whole. The suction filter 31 is housed in the fuel tank 2 and is disposed on the bottom portion 20b in the sub tank 20. The suction filter 31 captures foreign matter in the stored fuel by filtering the stored fuel flowing into the sub tank 20 in the fuel tank 2.

The fuel pump 32 is an electric pump having a cylindrical shape as a whole. The fuel pump 32 is stored in the fuel tank 2 and extends to an outside of the sub tank 20 from a position above the suction filter 31 in the sub tank 20. The inlet 32a of the fuel pump 32 is in communication with the suction filter 31. The fuel pump 32 operates under control by the external control circuit. The fuel pump 32 in operation takes in a fuel that was filtered by the suction filter 31 (hereinafter, referred to as a "filtered fuel") through the inlet 32a in the fuel tank 2. The filtered fuel taken into the inlet 32a is discharged through an outlet 32b of the fuel pump 32 toward the internal combustion engine 3 outside of the fuel tank 2 by receiving a pressure force in the fuel pump 3.

The communication member 33 is formed of hard resin to have a hollow shape. The communication member 33 is housed in the fuel tank 2 and is fixed to the flange 10. The communication member 33 extends to an outside of the sub tank 20 from a periphery of the fuel pump 32 in the sub tank 20. The communication member 33 defines a communication passage 33a therein that is in communication with the outlet 32b and the fuel supply passage 11. The communication passage 33a supplies a fuel discharged from the outlet 32b by the fuel pump 32 to the internal combustion engine 3 through the fuel supply passage 11. A metal lead wire 33b is disposed inside the communication member 33 to electrically connect the fuel pump 32 to the metal terminal 12a.

Figure 2:
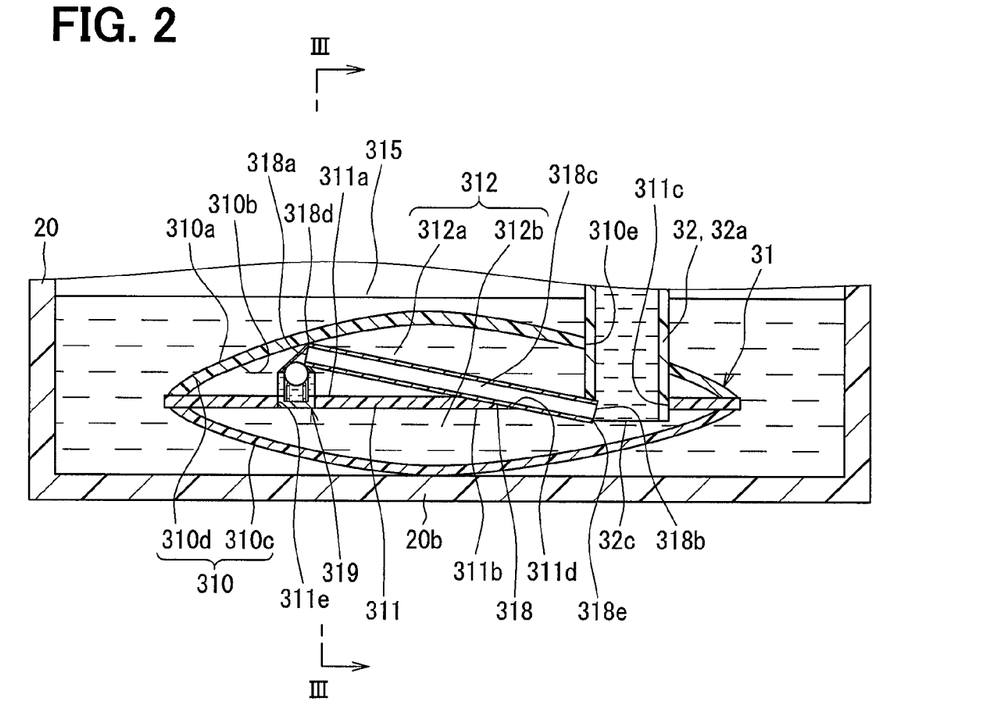
FIG. 2 is an enlarged cross-sectional view of a suction filter according to the first embodiment.
Figure 3:
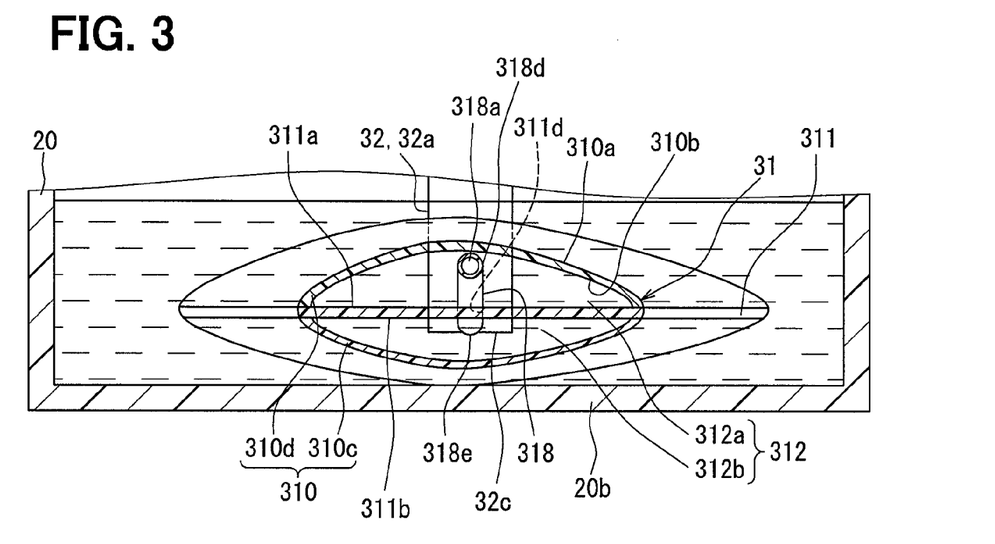
FIG. 3 is a cross-sectional view taken along III-III line in FIG. 2.

Next, the configuration of the suction filter 31 will be described in detail. As shown in FIGS. 1 to 3, the suction filter 31 includes a filter element 310 and a partitioning wall element 311 in the sub tank 20 of the fuel tank 2.

The filter element 310 is arranged to have a shape as shown in FIGS. 1 and 2 so that an outer surface 310a of the filter element 310 is exposed inside of the sub tank 20 of the fuel tank 2, and an inner surface 310b of the filter element 310 surrounds the inside space 312. The filter element 310 has a pair of filter sheets 310c, 310d, and an outer circumferential edge of each filter sheet 310c, 310d is liquid-tightly sealed with each other.

Each of the filter sheets 310c, 310d is entirely formed of material such as a porous resin, a woven fabric, a nonwoven fabric, a resin mesh, or a metal mesh, which provides a filtering trait. The filter sheets 310c, 310d are formed into a flexible or hard form and have a curved film shape. Fineness of each filter sheet 310c, 310d is set to have a value so as to capture micro foreign matter having an external diameter of, e.g., 10 μm or more in the stored fuel flowing into the sub tank 20 from the fuel tank 2.

In the filter element 310 shown in FIG. 2, a through hole 310e is defined in the upper filter sheet 310d that is sealed with the lower filter sheet 310c from an upper side of the lower liter seat 310c. The inlet 32a of the fuel pump 32 passes through the through hole 310 from the outside space 315 of the filter element 310 toward the inside space 312. The through hole 310e is liquid-tightly sealed with the inlet 32a at a position above an opening 32c of the inlet 32a that is open downward.

Due to the above-described configuration of the filter element 310, the upper filter sheet 310d is held by the fuel tank 2 through the pump unit 30 and the flange 10, as shown in FIGS. 1 and 2. As a result, a portion of the lower filter sheet 310c is in contact with the bottom portion 20b of the sub tank 20 in the filter element 310.

As described above, the filter element 310 exhibits a filtering trait (i.e., a filtering function) to capture foreign matter at a passing area for the stored fuel when the stored fuel flowing into the sub tank 20 from the fuel tank 2 flows toward the inside space 312. The passing area for the stored fuel corresponds to each space of micro pores when a porous resin is used as material forming the filter element 310, each space formed between fibers when a woven fabric or a nonwoven fabric is used, or each space between meshes when a resin mesh or a metal mesh is used.

At the passing area, the stored fuel is captured in the spaces due to a surface tension. As a result, a liquid film that covers the outer surface 310a of the filter element 310 is simultaneously formed along with the filtering function. In other words, the filter element 310 exhibits the filtering function for the stored fuel while forming the liquid film on the outer surface 310a. To capture the foreign matter with the above-described diameter at the passing area for the stored fuel, fineness of the filter element 310 is set to have, e.g., about 10 μm as a minimum distance among the spaces.

The partitioning wall element 311 is arranged in the inside space 312 of the filter element 310. The partitioning wall element 311 is formed into a separating film form that divides the inside space 312 into a first space 312a and a second space 312b that is lower the first space 312a. In the present embodiment, almost the entire portion of the partitioning wall element 311 other than an outer circumferential edge is housed in the entire inside space 312, thereby partitioning entirely the inside space 312.

As shown in FIGS. 2 and 3, the partitioning wall element 311 is entirely sealed between the outer circumferential edges of the filter sheets 310c, 310d to generate a certain tension in the partitioning wall element 311 inside the inside space 312. The first space 312a is defined by the partitioning wall element 311 and the upper filter sheet 310d, whereby an upper surface 311a of the partitioning wall element 311 is exposed inside of the first space 312a. In addition, the second space 312b is defined by the partitioning wall element 311 and the lower filter sheet 310c, whereby a lower surface 311b of the partitioning wall element 311 is exposed inside of the second space 312b.

The partitioning wall element 311 is entirely formed of material such as a porous resin, a woven fabric, a nonwoven fabric, a resin mesh, or a metal mesh, which provide a filtering trait. The partitioning wall element 311 is formed into a flexible or hard form and has a flat film shape. Fineness of the partitioning wall element 311 is set to have a value so as to allow foreign matter that passed through the filer element 310 to pass through the partitioning wall element 311. That is, the fineness of the partitioning wall element 311 is equal to or greater than that of the filter sheets 310c, 310d. In other words, the diameter of each space of the partitioning wall element 311 is equal to or greater than that of the filter sheets 310c, 310d.

As shown in FIG. 2, the partitioning wall element 311 has a through hole 311c. The inlet 32a of the fuel pump 32 passes through the through hole 311c from the first space 312a above the partitioning wall element 311 toward the second space 312b below the partitioning wall element 311. The through hole 311c is liquid-tightly sealed with the inlet 32a at a position above the opening 32c open in the second space 312b.

As shown in FIGS. 1 and 2, the partitioning wall element 311 is held by the fuel tank 2 through the pump unit 30 and the flange 10. As a result, an almost entire region of the partitioning wall element 311 other than the outer circumferential edge is downwardly away from the upper filter sheet 310d, whereby the partitioning wall element 311 maintains the first space 312a formed between the partitioning wall element 311 and the filter element 310 with a specified volume. Furthermore, an almost entire region of the partitioning wall element 311 other than the outer circumferential edge is upwardly away from the lower filter sheet 310c, whereby the partitioning wall element 311 maintains the second space 312b formed between the partitioning wall element 311 and the filter element 310 with a specified volume. In this embodiment, the volume of the second space 312b is less than the volume of the first space 312a.

Accordingly, a negative suction pressure of the inlet 32a can be directly applied to the second space 312b from the opening 32c and be indirectly applied to the first space 312a through the partitioning wall element 311. The negative suction pressure of the inlet 32a can be indirectly applied to the outside space 315 through the partitioning wall element 311 and the upper filter sheet 310d, or through the lower filter sheet 310c. The opening 32c of the inlet 32a is positioned in an upper side of the second space 312b and is upwardly away from the lower filter sheet 310c. Therefore, the opening 32c less likely absorbs the lower filter sheet 310c even under the negative suction pressure.

As described above, the partitioning wall element 311 allows the filtered fuel, which was filtered by the upper filter sheet 310d of the filter element 310 and flowed into the first space 312a, to flow toward the second space 312b where the inlet 32a is open. The passing area for the filtered fuel corresponds to each space of micro pores when a porous resin is used as a material forming the partitioning wall element 311, each space formed between fibers when a woven fabric or a nonwoven fabric is used, or each space between meshes when a resin mesh or a metal mesh is used.

At the passing area, the filtered fuel is captured in the spaces due to a surface tension. As a result, a liquid film that covers the outer surface 311a of the partitioning wall element 311 is simultaneously formed. To allow the above-described foreign matter to pass through the passing area for the filtered fuel, fineness of the partitioning wall element 311 is set to have, e.g., about 10-100 μm as a minimum distance among the spaces. The filtered fuel filtered by the lower filter sheet 310c of the filter element 310 can directly flow into the second space 312b without passing through the partitioning wall element 311.

As shown in FIGS. 1 to 3, the suction filter 31 includes a passage element 318 and an open/close valve 319 as well as the filter element 310 and the partitioning wall element 311 in the sub tank 20 of the fuel tank 2. As shown in FIGS. 2 and 3, the partitioning wall element 311 includes a through hole 311d passing through the passage element 318 and a through hole 311e passing through the open/close valve 319.

The passage element 318 is formed of hard resin to have a cylindrical shape. The passage element 318 is arranged to extend over the first space 312a and the second space 312b. The passage element 318 linearly extends diagonally upward from the opening 32c of the inlet 32a.

The passage element 318 passes through the through hole 311d from the second space 312b below the partitioning wall element 311 toward the first space 312a above the partitioning wall element 311. The passage element 318 is liquid-tightly sealed with the though hole 311d. With this, the passage element 318 is held by the fuel tank 2 through the pump unit 30 and the flange 10. As a result, the passage element 318 is upwardly away from the lower filter sheet 310c of the filter element 310. The passage element 318 includes a single inflow opening 318a, a single outflow opening 318b, and a single flow passage 318c.

More specifically, the inflow opening 318a is open at a distal end 318d of the passage element 318 positioned away from the opening 32c of the inlet 32a. Especially, the distal end 318d is positioned at a separate side away from the opening 32c in the lateral direction in the first space 312a. As a result, the inflow opening 318a is positioned close to the separate side. Furthermore, the distal end 318d is upwardly away from the partitioning wall element 311 and is in contact with the upper filter sheet 310d. As a result, the inflow opening 318a is positioned at an upper side of the first space 312a. Accordingly, the inflow opening 318a is open at the distal end 318d in the first space 312a, whereby the filtered fuel can flow into the inflow opening 318a from the first space 312a.

The outflow opening 318b is open at a proximal end 318e that is opposite to the distal end 318d and is close to the opening 32c. In the present embodiment, the proximal end 318e passes through the opening 32c, whereby the outflow opening 318b is in direct communication with the inlet 32a. Therefore, the negative suction pressure of the inlet 32a can be applied to the outflow opening 318b that is open in the second space 312b in the proximal end 318e.

The flow passage 318c extends diagonally upward from the opening 32c between the distal end 318d and the proximal end 318e of the passage element 318. The flow passage 318c is in communication with the inflow opening 318a and the outflow opening 318b. The filtered fuel can flow through the flow passage 318c from the inflow opening 318a toward the outflow opening 318b. The negative suction pressure of the inlet 32a can be applied to the inflow opening 318a from the outflow opening 318b through the flow passage 318c.

Figure 4:
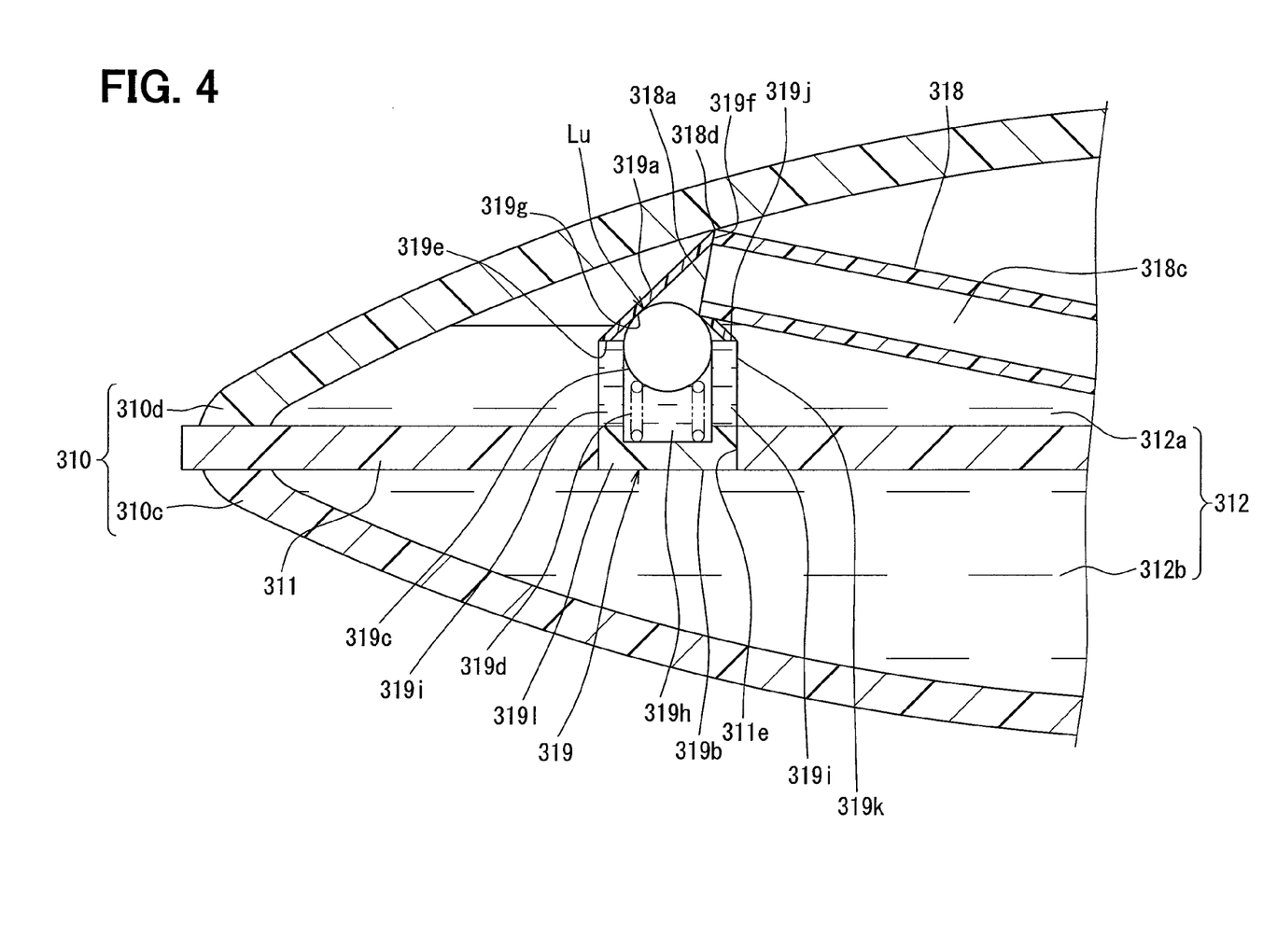
FIG. 4 is an enlarged cross-sectional view of an open/close valve of FIG. 2.
Figure 5:
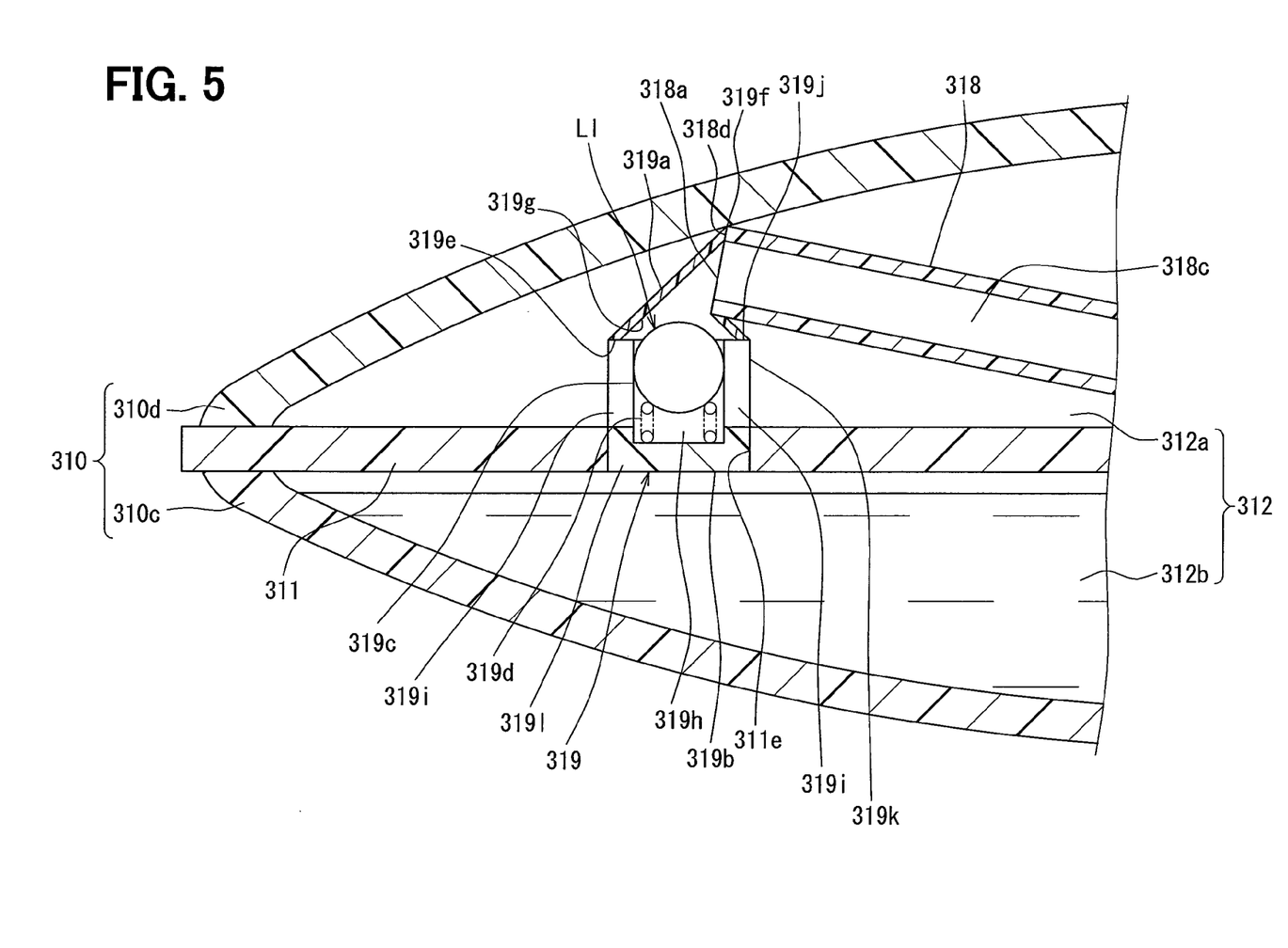
FIG. 5 is an enlarged cross-sectional view of the open/close valve in a different state from FIG. 4.

As shown in FIGS. 4 and 5, the open/close valve 319 is a so-called spring type check valve. The open/close valve 319 is disposed in the first space 312a. The open/close valve 319 includes a valve seat 319a, a guide member 319b, a valve element 319c, and an elastic member 319d.

The valve seat 319a is formed of hard resin to have a hollow cone shape. The valve seat 319a has an axial along the vertical direction. The valve seat 319a defines a seat hole 319g between a lower end 319e and an upper end 319f. The seat hole 319g has a tapered shape having a diameter that gradually narrows from the lower end 319e to the upper end 319f. The lower end 319e of the valve seat 319a faces downwardly in the first space 312a. The upper end 319f of the valve seat 319a is liquid-tightly sealed with the distal end 318d of the passage element 318, whereby the seat hole 319g is in communication with the inflow opening 318a.

The guide member 319b is formed of hard resin to have a cylindrical shape with a bottom. The guide member 319b is coaxially arranged with the valve seat 319a and thus has an axis along the vertical direction. The guide member 319b has a circumferential wall 319k surrounding a valve housing hole 319h that has a cylindrical shape. The guide member 319b defines valve through holes 319i at a plurality of locations of the circumferential wall 319k. Each of the valve through holes 319i is in communication with the first space 312a and the valve housing hole 319h. A lower end 319l of the guide member 319b is liquid-tightly sealed with the through hole 311e. An upper end 319j of the guide member 319b is liquid-tightly sealed with the lower end 319e of the valve element 319a, thereby communicating the valve housing hole 319h with the seat hole 319g.

With the configuration of the valve element 319a and the guide member 319b, the filtered fuel in the first space 312a can flow into the inflow opening 318a and the flow passage 318c in this order through each valve through hole 319i, the valve housing hole 319h, and the valve seat hole 319g.

The valve element 319c is formed of light resin that is capable of floating on a liquid level of the filtered fuel in the first space 312a. The valve element 319c has a spherical shape. The valve element 319c is housed in the valve seat 319a and the guide member 319b and is coaxial with the valve seat 319a and the guide member 319b. The valve element 319c extends from the valve housing hole 319h over the valve seat hole 319g. The valve element 319c is configured to reciprocate in the vertical direction while being guided along an inner circumferential surface of the circumferential wall 319k of the guide member 319b.

When the valve element 319c moves upward to an upper limit Lu shown in FIG. 4 and contacts the inner circumferential surface of the valve seat hole 319g, the inflow opening 318a is closed from the first space 312a. In this case, the negative suction pressure of the inlet 32 can be applied to the valve element 319c through the inflow opening 318a. On the other hand, when the valve element 319c moves downward from the upper limit Lu and separates from the inner circumferential surface of the valve seat hole 319g, the valve element 319c opens the inflow opening 318a of the first space 312a. FIG. 5 shows a lower limit Ll which is the lowest position of the valve element 319c.

The valve element 319c at a position lower than the upper limit Lu floats on the liquid level of the filtered fuel in the first space 312a of the inside space 312. Therefore, the valve element 319c can move following displacement of the liquid level regardless of the negative suction pressure from the inflow opening 318a. Furthermore, when the liquid level of the filtered fuel is above the partitioning wall element 311 in the inside space 312, the valve element 319c reaching the upper limit Lu as shown in FIG. 4 receives a negative suction pressure greater than the atmospheric pressure by a specified value or more, and then closes the inflow opening 318a at the upper limit Lu. Furthermore, in the inside space 312 after the valve element 319c reached the upper limit Lu, when the liquid level of the filtered fuel lowers below the partitioning wall element 311 as shown in FIG. 5, the valve element 319c receives a negative suction pressure greater than the atmospheric pressure by the specified valve or less, and then moves downward to the lower limit Ll to open the inflow opening 318a.

As shown in FIGS. 4 and 5, the elastic member 319d is a compressed coil spring formed by wounding a metal wire. The elastic member 319d is housed in and coaxial with the guide member 319b and has an axis along the vertical direction. The elastic member 319d is disposed in the valve housing hole 319h between the lower end 319l of the guide member 319b and the valve element 319c.

The elastic member 319d generates a restoring force from elastic deformation and biases the valve element 319c against the inner circumferential surface of the valve seat hole 319g. The restoring force is adjusted in advance such that the valve element 319c, which receives a negative suction pressure greater than the atmospheric pressure by the specified value or less at the upper limit Lu, can start moving downward when the liquid level in the inside space 312 reaches below the partitioning wall element 311 as shown in FIG. 5. When the liquid level in the inside space 312 moves below the partitioning wall element 311, air flowing into the second space 312b is taken in the inlet 32a together with the filtered fuel, and therefore the pressure difference between the atmospheric pressure and the negative suction pressure falls less than the specified value.

Next, operation and effects according to the first embodiment will be described.

In the first embodiment, the filter element 310 exposed inside of the fuel tank 2 forms the liquid film when the stored fuel passes through the filter element 310 from the fuel tank 2 into the inside space 312. Thus, in the sub tank 20 of the fuel tank 2, even when the liquid level is angled due to bias of the stored fuel as shown in FIG. 6 and the liquid level separates from each filter sheet 310c, 310d of the filter element 310 during, e.g., turning of the vehicle, the stored fuel can be suppressed to be leaked from the inside space 312.

The partitioning wall element 311 according to the first embodiment is arranged to divide the inside space 312 into the first space 312a into which the stored fuel at the filter element 310 and the second space 312b in which the inlet 32a of the fuel pump 3 is open. The partitioning wall element 311 forms the liquid film when the stored fuel passes through the partitioning wall element 311 from the first space 312a into the second space 312b. As a result, the filtered fuel can be captured in the first space 312a defined by the partitioning wall element 311 in an upper side of the inside space 312 together with the filter element 310 with the liquid film, as shown in FIG. 6.

Figure 6:
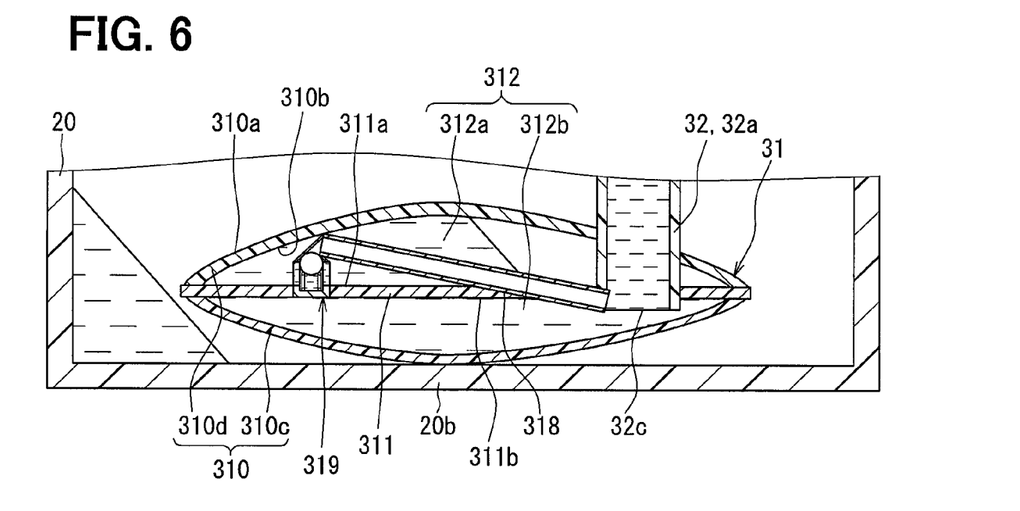
FIG. 6 is a cross-sectional view showing operation and effects of the suction filter according to the first embodiment.

In the first embodiment, even when the liquid level of the stored fuel is angled in the sub tank 20, contact of the filtered fuel of the first space 312a with the partitioning wall element 311 can be maintained under a state where capturing capacity is secured by the filter element 310, as shown in FIG. 6. As a result, in the partitioning wall element 311, which defines the second space 312b in a lower side of the inside space 312 together with the filter element 310, the liquid film is maintained. Therefore, the filtered fuel can be taken into the second space 312b having the inlet 32a from the first space 312a. Accordingly, suction of air into the inlet 32a can be suppressed by effectively using the filtered fuel in the first space 312a, and thus the discharging performance of the fuel pump 32 can be stabilized. In the first embodiment, discharged fuel from the fuel pump 32 is supplied to the internal combustion engine 3 outside of the fuel tank 2. Thus, since the discharging performance of the fuel pump 32 is stabilized, performance of drivability and acceleration of a vehicle can be obtained, and running out of gasoline and engine stall can be suppressed.

In addition, the passage element 318 according to the first embodiment defines the flow passage 318c from the inflow opening 318a, which is open in the first space 312a, to the outflow opening 318b, toward which a negative suction pressure of the inlet 32a is applied. Therefore, the negative suction pressure is applied to the inflow opening 318a through the flow passage 318c from the outflow opening 318b. In this case, even when air flows into the first space 312a, the liquid level of the filtered fuel is above the partitioning wall element 311 in the inside space 312, and thus the open/close valve 319 closes the inflow opening 318a as shown in FIG. 4. As a result, when the filtered fuel in the first space 312a is taken into the second space 312b through the partitioning wall element 311 and then is substantially exhausted, air flows into not only the first space 312a but also the second space 312b below the first space 312a. In this case, the liquid level of the filtered fuel is positioned below the partitioning wall element 311 in the inside space 312, and as a result, the open/close valve 319 opens the inflow opening 318a as shown in FIG. 5. Hence, air flowing into the inflow opening 318a from the first space 312a due to a negative suction pressure is discharged to the inlet 32a from the outflow opening 318b through the flow passage 318c.

As described above, air mixed with the filtered fuel in the first space 312a is restricted from flowing into the inflow opening 318a, and then is allowed to flow into the inflow opening 318a from the first space 312a where the filtered fuel is substantially exhausted. Therefore, the air can be taken into the inlet 32a in a short time. Thus, a necessary time for taking air into the inlet 32a is shortened, and deterioration in the stability of the discharging performance of the fuel pump 32 can be suppressed. Further, since suction of air into the inlet 32a can be instantly performed in the first space 312a, a space for capturing the filtered fuel can be instantly obtained again. Thus, the filtered fuel can be effectively used again immediately. As a result, it is further possible to suppress deterioration in the stability of the discharging performance of the fuel pump 32.

In the first space 312a according to the first embodiment, air is taken into the inlet 32a when the outflow opening 318a, which is positioned at an upper side of the first space 312a, is opened by the open/close valve 319. Thus, a space for capturing the filtered fuel can be obtained again to the upper side of the first space 312a. Accordingly, usability of the filtered fuel in the first space 312a can be enhanced, and therefore the stability of the discharging performance of the fuel pump 32 can be improved.

The valve element 319c of the open/close valve 319 according to the first embodiment moves upward in accordance with the liquid level of the filtered fuel in the inside space 312. When the liquid level is above the partitioning wall element 311, the valve element 319c closes the inflow opening 318a as shown in FIG. 4. As a result, air mixed with the filtered fuel in the first space 312a can be suppressed to flow into the inflow opening 318a. Accordingly, an increase in a time for taking the air into the inlet 32a can be suppressed. Therefore, an increase in a necessary time for re-obtaining a space to capture the filtered fuel can be suppressed. Thereafter, when the filtered fuel is substantially exhausted and the liquid level of the filtered fuel in the inside space 312 moves downward under the partitioning wall element 311, the valve element 319c moves downward to open the inflow opening 318a as shown in FIG. 5. As a result, only air is substantially taken into the inflow opening 318a in the first space 312a, whereby suction of air into the inlet 32a can be achieved in a short time. Therefore, a space for capturing the filtered fuel can be instantly regained in the first space 312a. By addressing the cause to deteriorate the stability of the discharging performance in the fuel pump 32, this stability can be improved.

In addition to the above, the volume of the second space 312b is smaller than the volume of the first space 312a in the first embodiment. As a result, even when air is taken into the second space 312b from the first space 312a, it is possible to reduce an amount of the filtered fuel remaining in the second space 312b without being taken into the inlet 32a. This is because when a ratio of the volume of air to the volume of the second space 312b has a specified value or more, only air is substantially taken into the inlet 32a and the filtered fuel remains in the second space 312b. Hence, an amount of the remaining filtered fuel can be decreased as the volume of the second space 312b decreases. Thus, in the first embodiment, as a result of effectively using the filtered fuel in the second space 312b, the stability of the discharging performance of the fuel pump 32 can be improved.

In the first embodiment, fineness of the partitioning wall element 311 to allow the filtered fuel to pass therethrough is set to have a value equal to or greater than the fineness of the filter element 310 that allows the stored fuel to pass through the filter element 310. Although, the partitioning wall element 311 has a surface area less than that of the filter element 310 because the partitioning wall element 311 partitions the inside space 312 of the filter element 310, it is possible to suppress the partitioning wall element 311 to be clogged with foreign matter that passed through the filter element 310. Thus, it is possible to suppress the stability of the discharging performance of the fuel pump 32 to deteriorate due to the clogging of the partitioning wall element 311.

Second Embodiment

Figure 7:
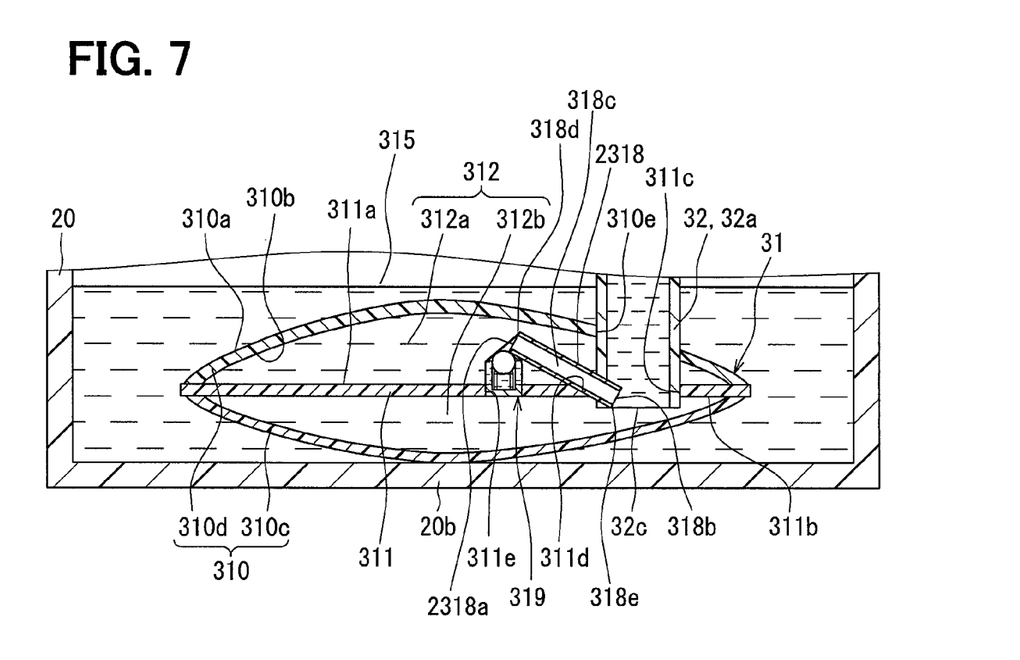
FIG. 7 is an enlarged cross-sectional view of the suction filter according to a second embodiment.

As shown in FIG. 7, the second embodiment of the present disclosure is a modification to the first embodiment. The passage element 2318 of the second embodiment has the distal end 318d positioned close to the inlet 32a in the lateral direction in the first space 312a. Thus, the inflow opening 2318a is also positioned close to the inlet 32a. In other points, the passage element 2318 is substantially the same as the passage element 318 of the first embodiment 318.

In the first space 312a of the second embodiment, when the inflow opening 2318a, which is positioned close to the inlet 32a in the lateral direction, is opened by the open/close valve 319, a pressure loss generated when air is taken into the inlet 32a can be reduced. Accordingly, air is smoothly taken into the inlet 32a, the air can be taken in a short time. Also, a necessary time for re-obtaining a space to capture the filtered fuel can be shortened. Therefore, the effect of suppressing deterioration in the stability of the discharging performance of the fuel pump 32 can be enhanced.

Other Embodiments

Figure 8:
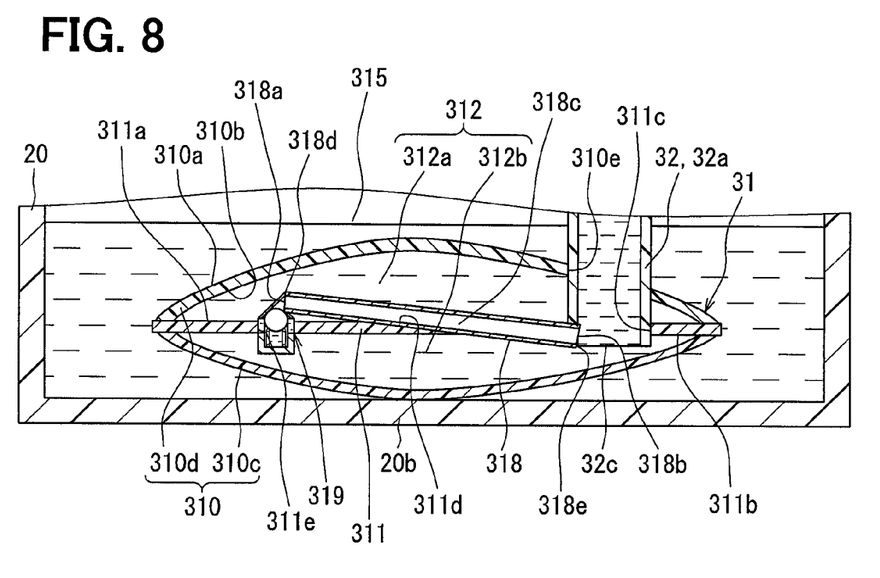
FIG. 8 is a cross-sectional view according to a modification to the first embodiment shown in FIG. 2.
Figure 9:
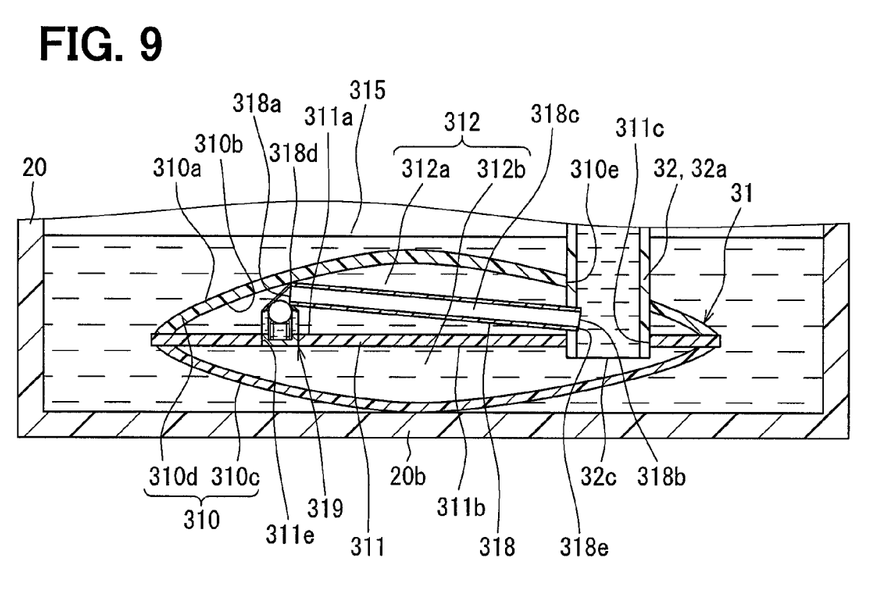
FIG. 9 is a cross-sectional view according to a modification to the first embodiment shown in FIG. 2.
Figure 10:
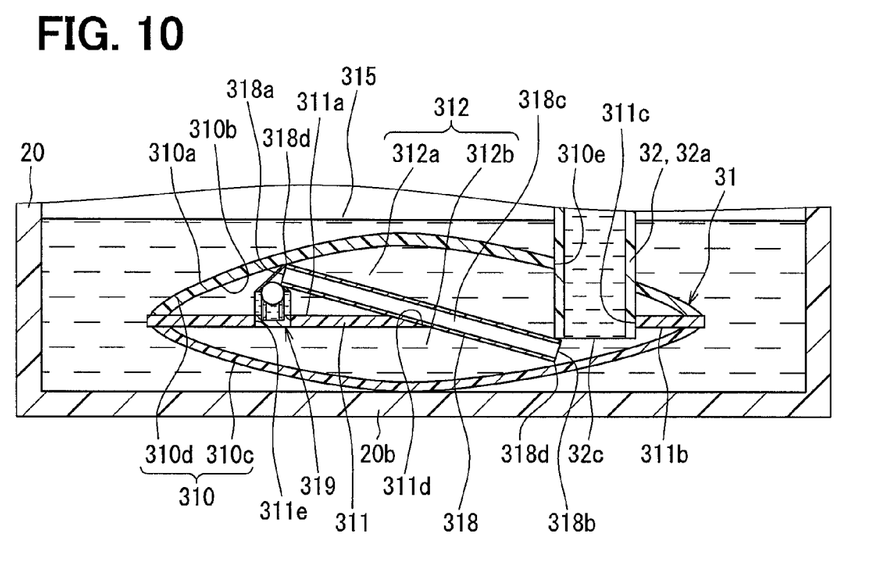
FIG. 10 is a cross-sectional view according to a modification to the first embodiment shown in FIG. 2.

In a first modification to the first and second embodiments, the inflow opening 318a, 2318a may be positioned at a lower side of the first space 312a as shown in FIG. 8. In a second modification to the first and second embodiments, the outflow opening 318b may be in communication with the inlet 32a at a position upwardly away from the opening 32c as shown in FIG. 9. In a third modification to the first and second embodiments, the outflow opening 318b may be arranged in a region below the opening 32c where a negative suction pressure is applied, as shown in FIG. 10. It should be noted that FIGS. 8 to 10 show the first to third modifications to the first embodiment, respectively.

In a fourth modification to the first and second embodiments, the passage elements 318, 2318 may be disposed both sides of the inlet 32a. The inlet 32a is interposed between the passage elements 318, 2318 in the lateral direction. In a fifth modification to the first and second embodiments, a plurality of inflow openings 318a, a plurality of outflow openings 318b, and a plurality of flow passages 318c may be formed in each of the passage elements 318, 2318.

In a sixth modification to the first and second embodiments, a spring-less type check valve without the elastic member 319d may be used as the open/close valve 319. In a seventh modification to the first and second embodiments, an solenoid valve that selectively opens and closes according to a negative suction pressure may be used as the open/close valve 319.

Figure 11:
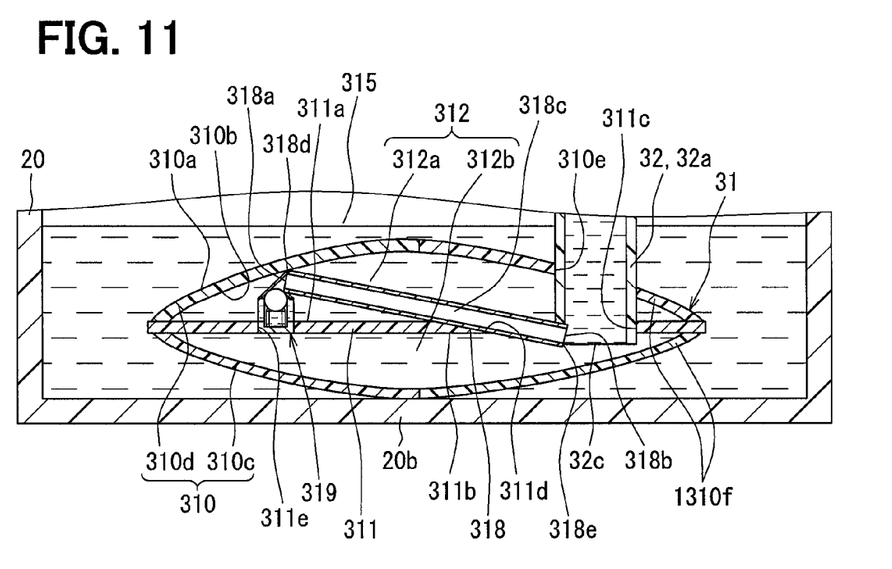
FIG. 11 is a cross-sectional view according to a modification to the first embodiment shown in FIG. 2.
Figure 12:
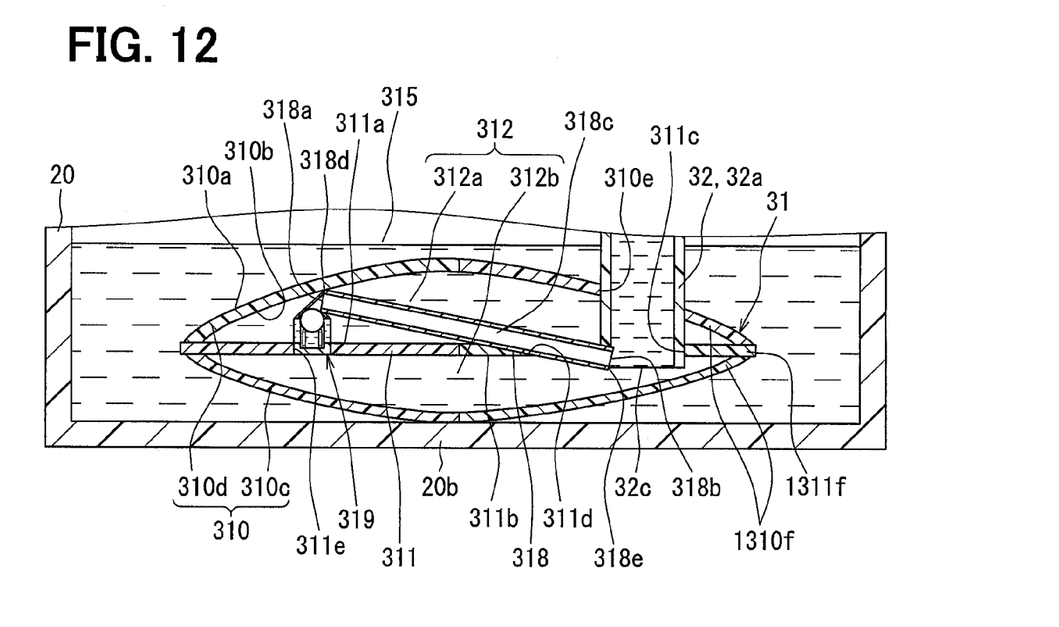
FIG. 12 is a cross-sectional view according to a modification to the first embodiment shown in FIG. 2.

In an eighth modification to the first and second embodiments, the volume of the second space 312b may be equal to or greater than the volume of the first space 312a. In a ninth modification to the first and second embodiments, fineness of the partitioning wall element 311, which allows the filtered fuel to pass through the partitioning wall element 311, may be less than that of the filter element 310, which allows the stored fuel to pass through the filter element 310. In a tenth modification to the first and second embodiments, a portion 1310f of the filter element 310 having a hollow shape as a whole may be formed of material having no filtering trait, such as hard resin, in place of material having filtering trait, as shown in FIGS. 11 and 12. FIGS. 11 and 12 show the tenth modification to the first embodiment where each of the portions 1310f of the filter sheets 310c, 310d formed of material with non-filtering trait.

Figure 13:
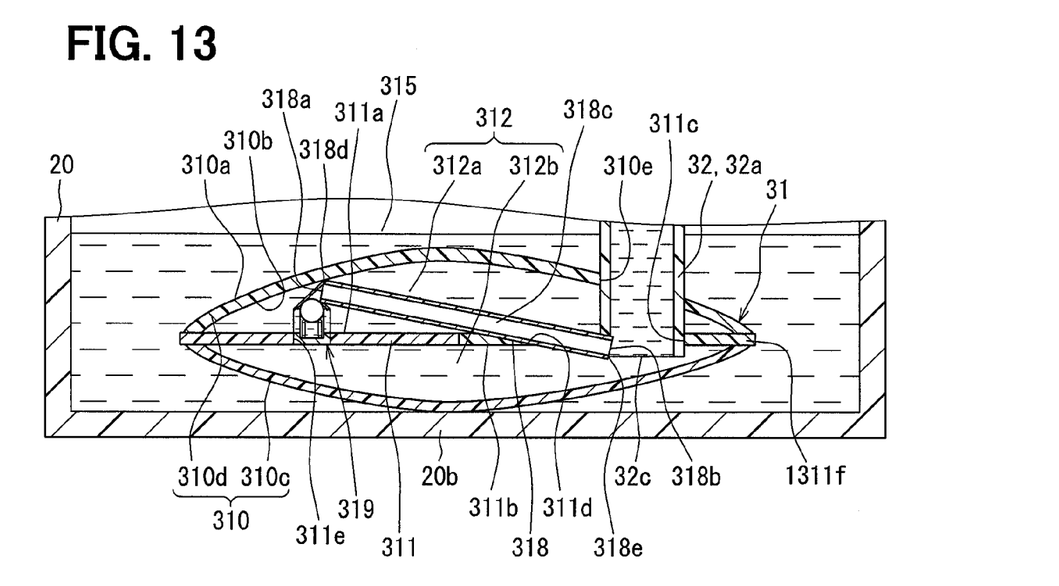
FIG. 13 is a cross-sectional view according to a modification to the first embodiment shown in FIG. 2.

In an eleventh modification to the first and second embodiments, a portion 1311f of the partitioning wall element 311 having a partitioning film shape as a whole may be formed of material having no filtering trait, such as hard resin, in place of material having filtering trait, as shown in FIGS. 12 and 13. FIGS. 12 and 13 show the eleventh modification to the first embodiment.

Figure 14:
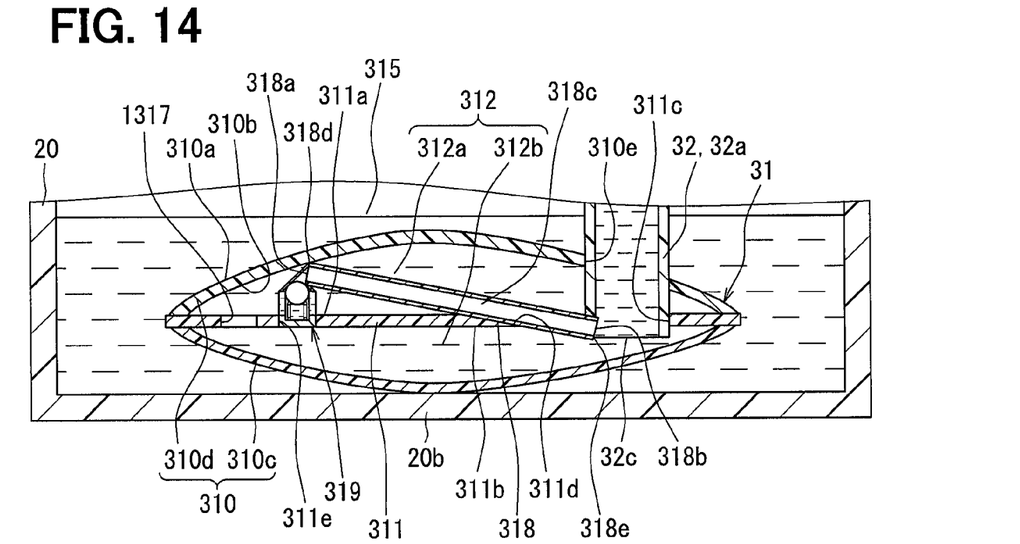
FIG. 14 is a cross-sectional view according to a modification to the first embodiment shown in FIG. 2.

In a twelfth modification to the first and second embodiments, a through opening 1317 may be formed in a portion of the partitioning wall element 311 to partially partition the inside space 312, as shown in FIG. 14. In the twelfth modification to the first embodiment as shown in FIG. 14, the through opening 1317 is positioned to be away from the inlet 32a in the lateral direction.

In a thirteenth modification to the first and second embodiments, the fuel supplying device 1 without the sub tank 20 may be used. In a fourteenth modification to the first and second embodiments, the opening 32c of the inlet 32a in the second space 312b may be open in, e.g., the lateral direction other than the downward direction.

Figure 15:
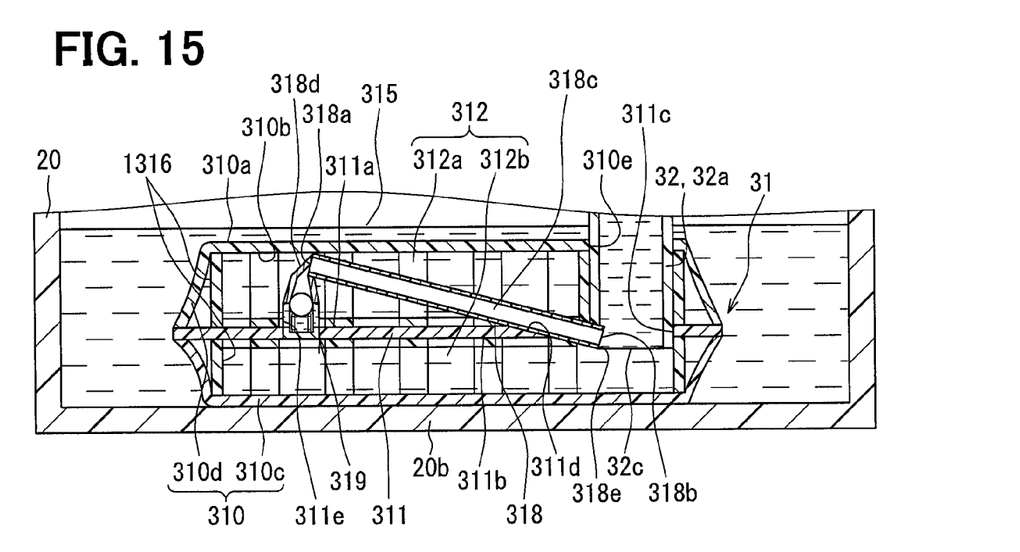
FIG. 15 is a cross-sectional view according to a modification to the first embodiment shown in FIG. 2.

In a fifteenth modification to the first and second embodiments, a holding element 1316, which is an inner frame of the suction filter 31, may be arranged in the inside space 312 of the filter element 310, as shown in FIG. 15. In the fifteenth modification to the first embodiment shown in FIG. 15, the holding element 1316 is formed of hard resin to have a rib shape. Accordingly, the holding element 1316 holds the partitioning wall element 1311 from both sides in the vertical direction while each of surfaces 311a, 311b are partially being exposed. The holding element 1319 also holds each of the filter sheets 310c, 310d of the filter element 310 by protruding toward both upper and lower sides at a plurality of positions such that the volume relationship between the first space 312a and the second space 312b is maintained. Furthermore, the holding element 1316 is equipped with the inlet 32a so that the positional relationship of the opening 32c in the second space 312b is maintained.

What is claimed is:

1. A suction filter that filters a fuel inside a fuel tank of a vehicle, the fuel being taken into an inlet of a fuel pump, the suction filter comprising:
   a filter element that is disposed in and exposed inside of the fuel tank, the filter element filtering a stored fuel stored in the fuel tank by allowing the stored fuel to pass therethrough into an inside space of the filter element;
   a partitioning wall element that is arranged in the inside space to divide the inside space into a first space and a second space that is lower than the first space, a filtered fuel filtered by the filter element flowing into the first space, the inlet to take in the filtered fuel being open in the second space, the partitioning wall element defining the first space together with the filter element and defining the second space together with the filter element;
   a passage element that defines an inflow opening that is open in the first space, an outflow opening to which a negative suction pressure is applied through the inlet, and a flow passage through which the filtered fuel flows toward the outflow opening from the inflow opening; and
   an open/close valve that closes the inflow opening when a liquid level of the filtered fuel in the inside space is above the partitioning wall element and that opens the inflow opening when the liquid level is below the partitioning wall element, wherein
   the outflow opening of the passage element is in direct communication with the inlet of the pump, and
   the open/close valve allows an air in the first space to be discharged through the passage element and the inlet of the pump by opening the inflow opening when the liquid level is below the partitioning wall element.

2. The suction filter according to claim 1, wherein the inflow opening is positioned in an upper side of the first space.

3. The suction filter according to claim 1, wherein the inflow opening is positioned in a side of the first space close to the inlet in a lateral direction.

4. The suction filter according to claim 1, wherein the open/close valve includes a valve element that floats on the liquid level of the filtered fuel, and
   the valve element closes the inflow opening when the valve element rises with the liquid level and opens the inflow opening when the valve element lowers with the liquid level.

5. A fuel supplying device that supplies a fuel inside a fuel tank of a vehicle to an outside of the fuel tank, the fuel supplying device comprising:
   a fuel pump that takes in the fuel through an inlet in the fuel tank and discharges the fuel toward the outside of the fuel tank; and
   a suction filter that filters the fuel in the fuel tank, the fuel being taken into the inlet after being filtered by the suction filter, wherein the suction filter includes:
- a filter element that is disposed in and exposed inside the fuel tank, the filter element filtering a stored fuel stored in the fuel tank by allowing the stored fuel to pass therethrough into an inside space of the filter element;
- a partitioning wall element that is arranged in the inside space to divide the inside space into a first space and a second space that is lower than the first space, a filtered fuel filtered by the filter element flowing into the first space, the inlet to take in the filtered fuel being open in the second space, the partitioning wall element defining the first space together with the filter element and defining the second space together with the filter element;
- a passage element that defines an inflow opening that is open in the first space, an outflow opening to which a negative suction pressure is applied through the inlet, and a flow passage through which the filtered fuel flows toward the outflow opening from the inflow opening; and
- an open/close valve that closes the inflow opening when a liquid level of the filtered fuel in the inside space is above the partitioning wall element and that opens the inflow opening when the liquid level is below the partitioning wall element, wherein the outflow opening of the passage element is in direct communication with the inlet of the pump, and the open/close valve allows an air in the first space to be discharged through the passage element and the inlet of the pump by opening the inflow opening when the liquid level is below the partitioning wall element.

* * * * *